(12) United States Patent
Roweth et al.

(10) Patent No.: US 12,547,557 B2
(45) Date of Patent: Feb. 10, 2026

(54) SYSTEM AND METHOD FOR FACILITATING EFFICIENT EVENT NOTIFICATION MANAGEMENT FOR A NETWORK INTERFACE CONTROLLER (NIC)

(71) Applicant: Hewlett Packard Enterprise Development LP, Spring, TX (US)

(72) Inventors: Duncan Roweth, Bristol (GB); Edwin L. Froese, Burnaby (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 103 days.

(21) Appl. No.: 18/655,405

(22) Filed: May 6, 2024

(65) Prior Publication Data
US 2024/0291750 A1 Aug. 29, 2024

Related U.S. Application Data

(63) Continuation of application No. 17/594,615, filed as application No. PCT/US2020/024248 on Mar. 23, 2020, now Pat. No. 11,991,072.

(Continued)

(51) Int. Cl.
*G06F 13/16* (2006.01)
*G06F 9/54* (2006.01)
(Continued)

(52) U.S. Cl.
CPC .......... *G06F 13/1642* (2013.01); *G06F 9/546* (2013.01); *G06F 13/1673* (2013.01); *G06F 13/385* (2013.01); *G06F 13/4068* (2013.01);
*G06F 13/4221* (2013.01); *H04L 45/028* (2013.01); *H04L 47/30* (2013.01); *H04L 47/32* (2013.01); *H04L 49/3018* (2013.01); *H04L 49/3027* (2013.01); *H04L 49/90* (2013.01); *H04L 49/9047* (2013.01); *G06F 2213/3808* (2013.01); *H04L 69/28* (2013.01)

(58) Field of Classification Search
CPC .. G06F 9/546; G06F 13/1642; G06F 13/1673; G06F 13/385; G06F 13/4068; G06F 13/4221; G06F 2213/3808
See application file for complete search history.

(56) References Cited

U.S. PATENT DOCUMENTS 10,740,243 B1 * 8/2020 Benisty .................. G06F 3/061
2002/0152328 A1 * 10/2002 Kagan ..................... H04L 49/90
709/250

(Continued)

*Primary Examiner* — Eric T Oberly
(74) *Attorney, Agent, or Firm* — Yao Legal Services, Inc.

(57) ABSTRACT

A network interface controller (NIC) capable of efficient event management is provided. The NIC can be equipped with a host interface, a first memory device, and an event management module. During operation, the host interface can couple the NIC to a host device. The event management module can identify an event associated with an event queue stored in a second memory device of the host device. The event management module can insert, into a buffer, an event notification associated with the event. The buffer can be associated with the event queue and stored in the first memory device. If the buffer has met a release criterion, the event management module can insert, via the host interface, the aggregated event notifications into the event queue.

20 Claims, 9 Drawing Sheets

Related U.S. Application Data

(60) Provisional application No. 62/852,273, filed on May 23, 2019, provisional application No. 62/852,203, filed on May 23, 2019, provisional application No. 62/852,289, filed on May 23, 2019.

(51) Int. Cl.

| | | |
|---|---|---|
| *G06F 13/38* | (2006.01) | |
| *G06F 13/40* | (2006.01) | |
| *G06F 13/42* | (2006.01) | |
| *H04L 45/028* | (2022.01) | |
| *H04L 47/30* | (2022.01) | |
| *H04L 47/32* | (2022.01) | |
| *H04L 49/00* | (2022.01) | |
| *H04L 49/90* | (2022.01) | |
| *H04L 49/9047* | (2022.01) | |
| *H04L 69/28* | (2022.01) | |

(56) References Cited

U.S. PATENT DOCUMENTS

| | | | |
|---|---|---|---|
| 2003/0091055 A1* | 5/2003 | Craddock | H04L 49/9057 370/400 |
| 2004/0049580 A1* | 3/2004 | Boyd | H04L 69/12 709/242 |
| 2006/0173970 A1* | 8/2006 | Pope | G06F 13/28 709/216 |
| 2008/0155154 A1* | 6/2008 | Kenan | H04L 69/16 710/263 |
| 2012/0307838 A1* | 12/2012 | Manula | H04L 49/358 370/412 |
| 2014/0286256 A1* | 9/2014 | Chowdhury | H04L 47/2416 370/328 |
| 2016/0342567 A1* | 11/2016 | Tsirkin | H04L 49/901 |

\* cited by examiner

SYSTEM AND METHOD FOR FACILITATING EFFICIENT EVENT NOTIFICATION MANAGEMENT FOR A NETWORK INTERFACE CONTROLLER (NIC)

CROSS REFERENCE TO RELATED APPLICATIONS

This application is a continuation of U.S. patent application Ser. No. 17/594,615, filed on Oct. 25, 2021, which application is a national stage of International Application No. PCT/US2020/024248, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,889. The disclosures of the aforementioned applications are hereby incorporated by reference in their entireties.

BACKGROUND

Field

This is generally related to the technical field of networking. More specifically, this disclosure is related to systems and methods for facilitating a network interface controller (NIC) with efficient event management.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (TOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficient event management is provided. The NIC can be equipped with a host interface, a first memory device, and an event management logic block. During operation, the host interface can couple the NIC to a host device. The event management logic block can identify an event associated with an event queue stored in a second memory device of the host device. The event management logic block can insert, into a buffer, an event notification associated with the event. The buffer can be associated with the event queue and stored in the first memory device. If the buffer has met a release criterion, the event management logic block can insert, via the host interface, the aggregated event notifications into the event queue.

BRIEF DESCRIPTION OF THE FIGURES

In the figures, like reference numerals refer to the same figure elements.

DETAILED DESCRIPTION

Figure 1:
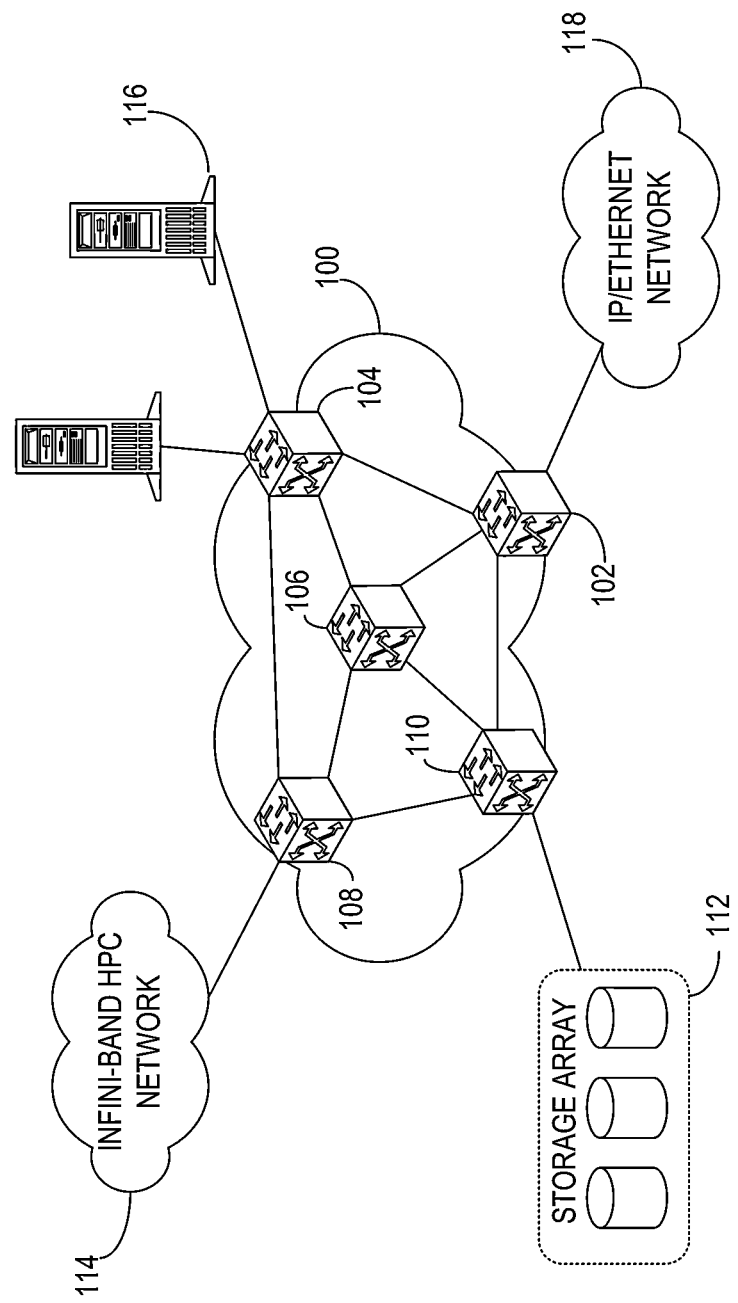
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient notification management in a network interface controller (NIC). The NIC allows a host to communicate with a data-driven network.

The embodiments described herein solve the problem of under-utilization of host interface width caused by inefficient event notification transfers by (i) aggregating event notifications in a combining buffer of a NIC, and (ii) providing the aggregated event notifications via the host interface, thereby utilizing the width of the host interface for a respective event notification.

During operation, an application, which can operate on a host device of a NIC, can issue a command for a data operation (e.g., a "GET" or a "PUT" command of remote direct memory access (RDMA)) to the NIC. Consequently, the host device can transfer the command (e.g., a direct memory access (DMA) descriptor of the command) to the NIC. Upon completion of the operation, the NIC may notify the host device that the operation has been completed. In addition to the event completion notifications, the NIC may also need to provide other event notifications, such as an error notification or telemetry data obtained via measurements. Typically, the memory of the host device can maintain one or more event queues associated with different events. The NIC can send an event notification that writes into a corresponding event queue Upon receiving the event notification via the host interface, the host device can write the event notification into the event queue of the memory. The application can obtain the event notification from the event queue. However, an event notification may be relatively short compared to the bit width (or width) of the host interface. For example, the host interface can be a peripheral component interconnect express (PCIe) interface that can support N bytes of data transfer per clock cycle. In other words, the width of the host interface can be N bytes. However, a typical event notification may be M, where M<N, bytes long. Consequently, issuing PCIe write operation for an M-byte event notification can cause significant underutilization of the host interface.

To solve this problem, the NIC can aggregate a plurality of event notifications into a single notification and send the aggregated event notification via the host interface. The aggregated notification may have a length that can correspond to the width of the interface. As a result, the aggregated notification can efficiently utilize the width of the interface. During operation, the NIC can generate an event notification for an event and determine a corresponding event queue associated with the event. The NIC can then allocate the event notification to a combining buffer associated with the event queue. The NIC can continue to aggregate notifications associated with the event until a new event notification cannot be included in the buffer, or the new event notification fills the buffer. The NIC can then issue an interface-based write operation that inserts the event notifications from the buffer to the corresponding event queue. In this way, the NIC can utilize the width of the host interface, thereby facilitating efficient event management for the NIC.

One embodiment of the present invention provides a NIC that can be equipped with a host interface, a first memory device, and an event management logic block. During operation, the host interface can couple the NIC to a host device. The event management logic block can identify an event associated with an event queue stored in a second memory device of the host device. The event management logic block can insert, into a buffer, an event notification associated with the event. The buffer can be associated with the event queue and stored in the first memory device. If the buffer has met a release criterion, the event management logic block can insert, via the host interface, the aggregated event notifications into the event queue.

In a variation on this embodiment, the event management logic block can determine that the buffer has met the release criterion by determining that a timer for the buffer has reached a latency tolerance for the event queue.

In a further variation, the second memory device may store a plurality of event queues. A respective event queue can then be associated with a distinct latency tolerance.

In a variation on this embodiment, the buffer can be distributed across a plurality of memory logic blocks of the first memory device.

In a further variation, the granularity of the event notification may correspond to a multiple of a size of a memory logic block.

In a variation on this embodiment, if a new buffer has not been allocated for the event queue, the event management logic block can allocate the new buffer for the event queue.

In a variation on this embodiment, the release criterion can be based on one or more of: (i) the buffer not having the capacity for a new event notification, and (ii) the buffer being filled by the insertion of the event notification.

In a variation on this embodiment, if the event notification is an initial notification, the event management logic block can insert null events into a remainder of the buffer.

In a variation on this embodiment, the event management logic block can store event notifications of different sizes in the same buffer.

In a variation on this embodiment, the host interface can be a peripheral component interconnect express (PCIe) interface. The event management logic block can then insert the aggregated event notifications into the event queue based on a PCIe write.

Figure 2A:
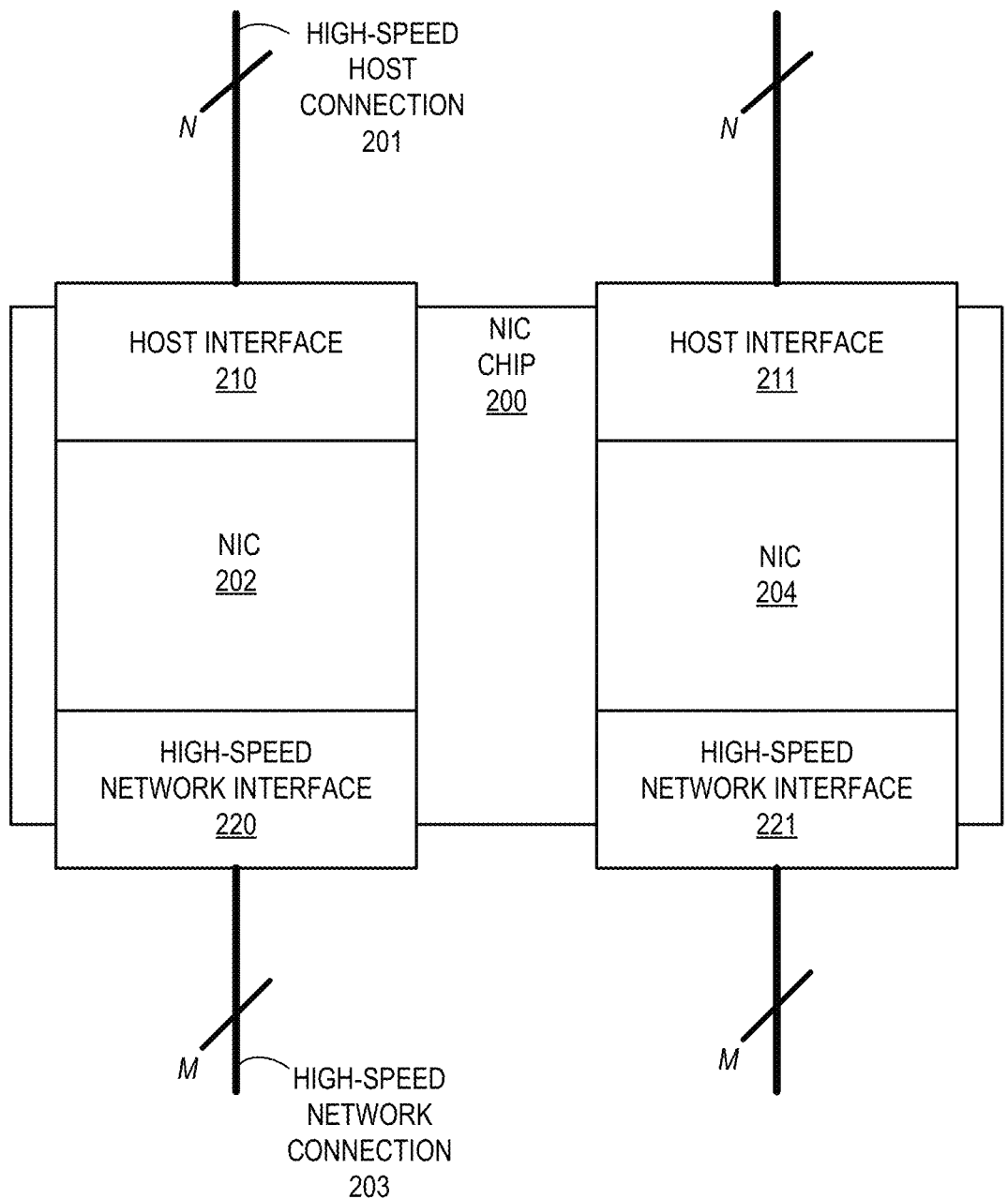
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient event management.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
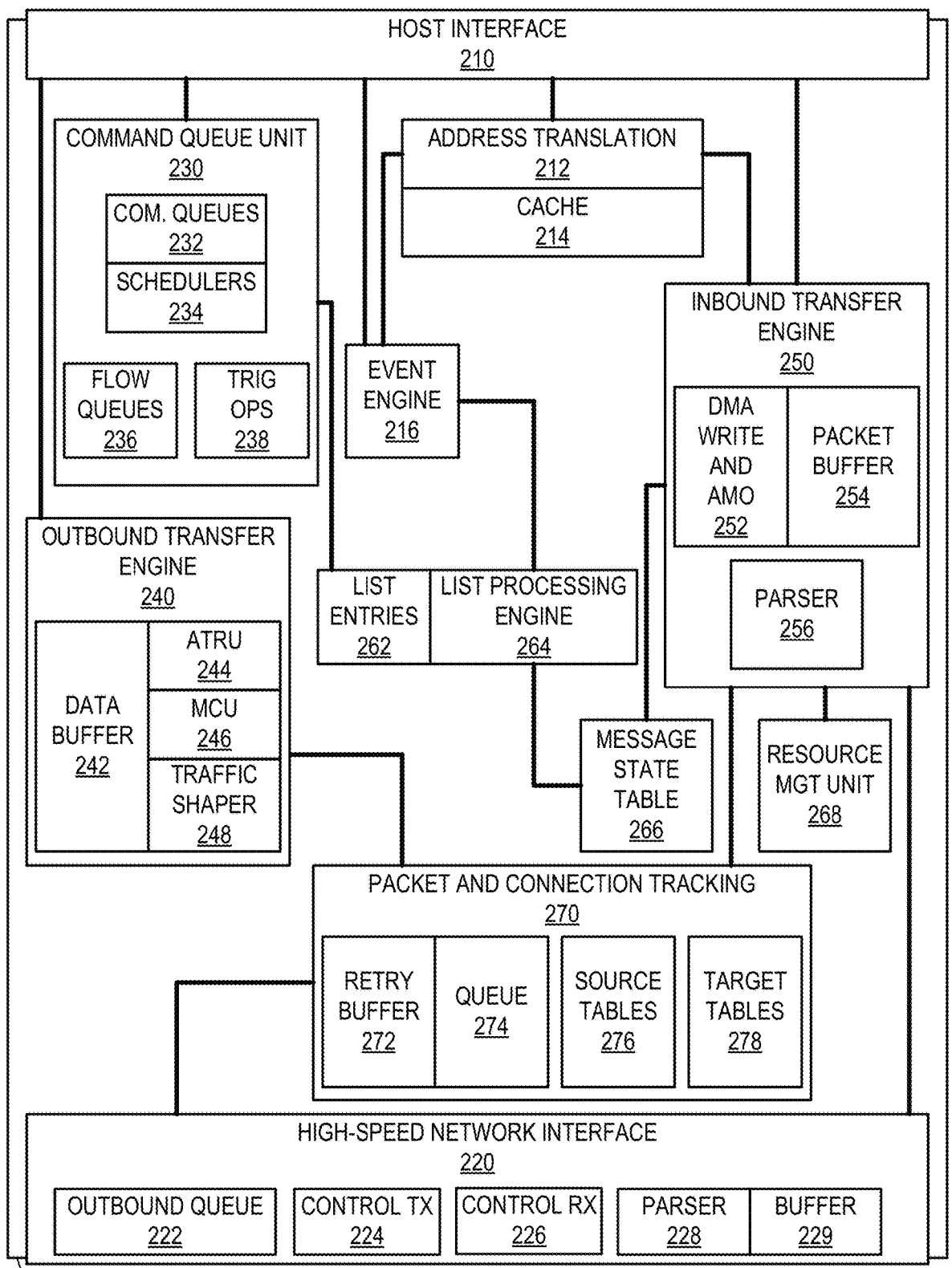
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be retrieved from retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. An event can be an internal control message for communication among the elements of NIC 202. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET request), the packet can be passed to the OXE 240. NIC 202 can also include an EE 216, which can receive requests to generate event notifications from other modules or units in NIC 202. An event notification can specify that either a full event or a counting event is generated. EE 216 can manage event queues, located within host processor memory, to which it writes full events. EE 216 can forward counting events to CQ unit 230.

Event Management in NIC

Figure 3A:
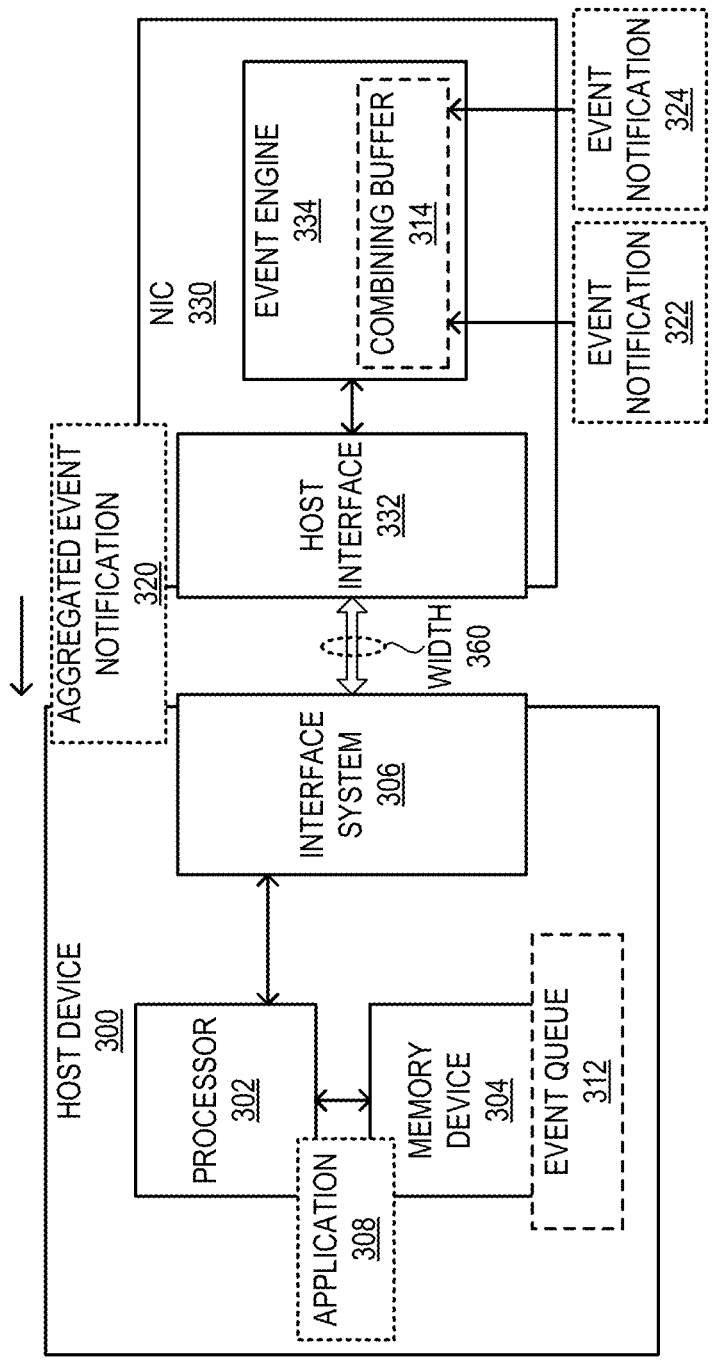
FIG. 3A shows an exemplary efficient notification management process in a NIC.

FIG. 3A shows an exemplary efficient notification management process in a NIC. In this example, a host device 300 can be equipped with a NIC 330. Device 300 can include a processor 302, a memory device 304, and an interface system 306. An HI 332 of NIC 330 can be coupled to interface system 306 of device 300. In some embodiments, HI 332 can be a PCIe interface, and interface system 306 can be a PCIe system that provides a slot for HI 332. NIC 330 can also include an EE 334 for managing events, as described in conjunction with FIG. 2B.

Typically, an application 308 running on device 300 can issue a command for a data operation (e.g., an RDMA operation) to NIC 330. Consequently, device 300 can transfer the command to NIC 330. Upon completion of the operation, NIC 330 may notify device 330 that the operation has been completed. In addition to the event completion notifications, NIC 330 may also need to provide other event notifications, such as an error notification or telemetry data obtained via measurements, to device 300. Typically, memory device 304 can maintain one or more event queues associated with different events. For example, memory device 304 can include an event queue 312 for a type of event, such as notifications for write operations.

Upon completion of an event, EE 334 can generate an event notification 322 (e.g., a DMA descriptor) associated with an event. EE 334 can then issue a corresponding interface-based write operation for storing event notification 322 into event queue 312. The write operation can be associated with an enqueue operation into event queue 312. Upon receiving event notification 322 via interface system 306, processor 302 can write event notification 322 into event queue 312. Application 308 can obtain event notification 322 from event queue 312. In this way, application 308 can determine whether an operation issued from application 308 has been completed.

However, event notification 322 may be relatively short compared to width 360 of interface system 306. For example, interface system 306 can provide a PCIe interface that can support 64 bytes of data transfer per clock cycle. Hence, width 360 of interface system 306 can be 64 bytes. However, event notification 322 may be significantly shorter than width 360. Consequently, issuing PCIe write operation (e.g., the enqueue operation into event queue 312) for event notification 322 can cause significant underutilization of the transfer capability offered by width 360.

To solve this problem, NIC 330 can aggregate a plurality of event notifications associated with event queue 312 into a single notification 320 and send aggregated event notification 320 via HI 332. During operation, upon retrieving an event, EE 334 can generate an event notification 322 and determine that event queue 312 is associated with the event. Instead of sending event notification 322 to host 300, EE 334 can identify a combining buffer 314 in NIC 330. Here, combining buffer 314 can be allocated for aggregating event notifications destined to event queue 312. If no combining buffer is allocated for event queue 312 when event notification 322 is generated, NIC 330 can allocate a new combining buffer (i.e., combining buffer 314 can be newly allocated buffer). EE 334 can then store event notification 322 in combining buffer 314.

Similarly, upon generating another event notification 324 for event queue 312, EE 334 can determine whether a combining buffer has been allocated for event queue 312. EE 334 can identify combining buffer 314 and insert event notification 324 into combining buffer 314. At this point, combining buffer 314 can store event notifications 322 and 324. In this way, EE 334 can continue to aggregate notifications associated with event queue 312. EE 334 can then determine whether combining buffer 314 meets a release criterion. For example, if a subsequent event notification cannot be included in combining buffer 314 or event notification 324 fills combining buffer 314, EE 334 can determine that combining buffer 314 has met the release criterion and should be inserted into event queue 312. Accordingly, EE 334 can initiate data transfer to host 300.

EE 334 can aggregate the content of combining buffer 314, which can include event notifications 322 and 324, into a single aggregated notification 320. Aggregated notification 320 may have a length that can correspond to width 360. If the combined length of event notifications 322 and 324 is smaller than width 360, EE 334 may pad aggregated notification 320 with null events (e.g., null values) to adjust to width 360. For efficient padding, NIC 330 may pad combining buffer 314 with the null events upon inserting event notification 322. Upon insertion into combining buffer 314, event notification 324 can replace the null event subsequent to event notification 322 in combining buffer 314. EE 334 can then issue an interface-based write operation that inserts aggregated notification 320 to event queue 312. In this way, aggregated notification 320 can efficiently utilize width 360, thereby facilitating efficient event management for NIC 330.

In some embodiments, event queue 312 can be configured with a latency tolerance. Combining buffer 314 can store event notifications for a duration indicated by the latency tolerance. If the latency tolerance is set to zero, upon receiving event notification 322 and inserting into combining buffer 314, EE 334 can insert the content of combining buffer 314 into event queue 312. Since the rest of combining buffer 314 can be padded with null events, EE 334 can readily issue the write operation via HI 332. However, if the latency tolerance is set to a non-zero value, EE 334 may wait for more event notifications until a timer corresponding to the latency tolerance expires. Suppose that device 300 maintains a plurality of event queues in memory device 304. Two different event queues can then have the same or two distinct latency tolerances.

Figure 3B:
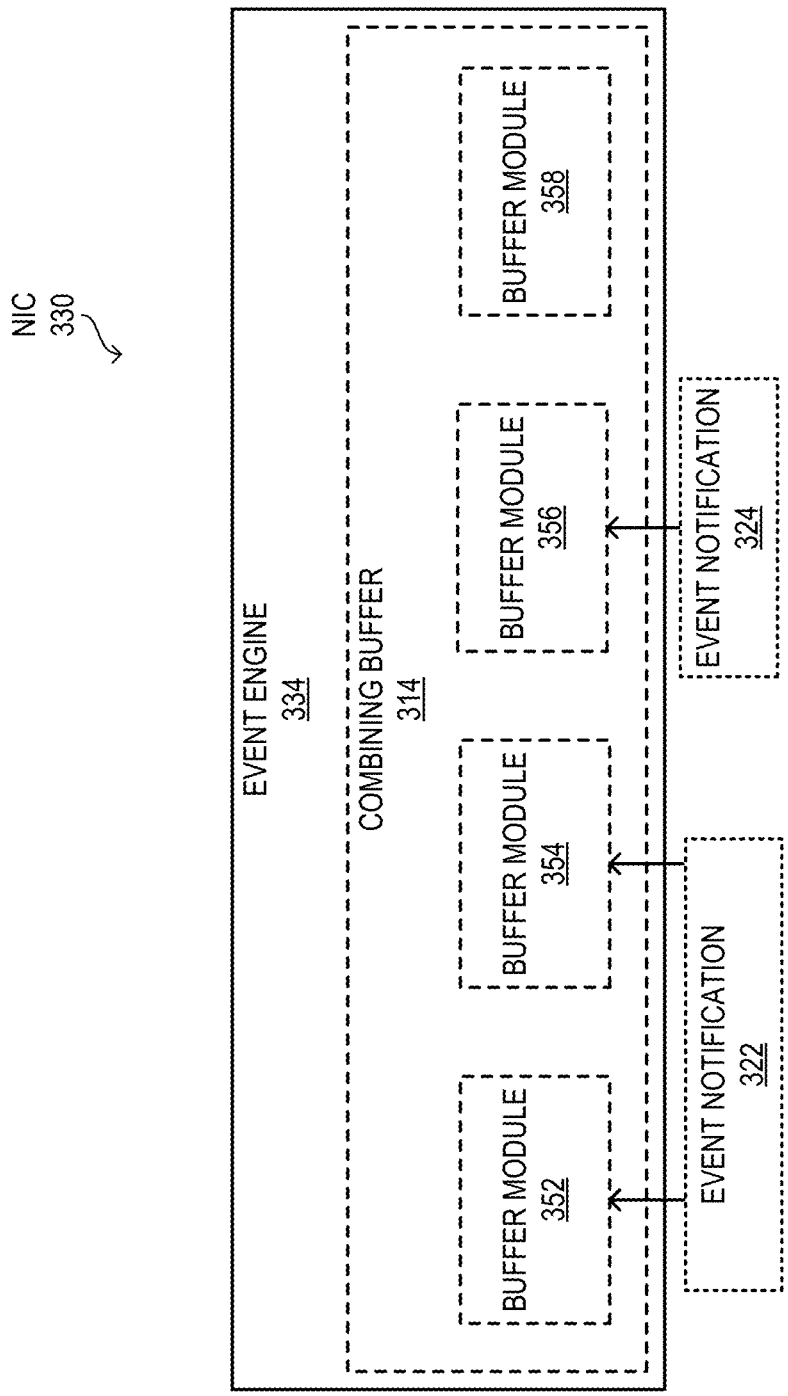
FIG. 3B shows an exemplary combining buffer for facilitating efficient event notification management in a NIC.

FIG. 3B shows an exemplary combining buffer for facilitating efficient event notification management in a NIC. Combining buffer 314 can be facilitated based on a number of buffer modules 352, 354, 356, and 358. In some embodiments, a buffer module can be a random access memory (RAM) device. For example, if width 360 in FIG. 3A is 64 bytes, combining buffer 314 may also have the capacity to hold 64 bytes. Consequently, each of buffer modules 352, 354, 356, and 358 can store at least 16 bytes of data. In this way, four separate buffer modules can facilitate the overall width of 64 bytes. Furthermore, each of buffer modules 352, 354, 356, and 358 can include additional capacity to store error-correcting codes (e.g., a single error correction/double error detection (SECDED) code). The SECDED code stored in a buffer module can be used to protect that buffer module.

Combining multiple buffer modules to form combining buffer 314 can allow individual event notifications (e.g., individual 16-byte segments) to be written while leaving other segments unmodified. As a result, if buffer module 352 already stores event notification 322, inserting another event notification 324 into buffer modules 356 and 358 may not affect the content of buffer module 352. As a result, inserting an event notification into partially-filled combining buffer 314 may not need reading the content of combining buffer 314, modifying the content, and rewriting the modified content into combining buffer 314. Since a buffer module may support a single read and write per clock cycle, one of the buffer modules can be read from while another of the buffer modules can be written into in the same clock cycle.

In some embodiments, an event notification can be generated to align with the size of a buffer module. Therefore, the size of an event notification can be a multiple of the size of a buffer module. For example, if the size of a buffer module is 16 bytes, the size of an event notification can be 16, 32, or 64 bytes long, depending on the content of the event notification. EE 334 may store event notifications of different sizes in the same combining buffer 314. An event notification can be stored at an address offset aligned for the size of the event notification. For example, a 16-byte event notification can be written at a location aligned with a 16 byte-aligned address. If an event notification does not align with the size of a buffer module, EE 334 may insert null events to provide the alignment.

If the size of a buffer module is 16 bytes, in this example, event notifications 322 and 324 can be 32 and 16 bytes long, respectively. Consequently, event notification 322 can be stored in buffer modules 352 and 354, and event notification 324 can be stored in buffer module 356. If EE 334 determines that the subsequent event notification does not fit in buffer module 358, EE 334 can enqueue the content of combining buffer 314. When EE 334 writes the first event notification in combining buffer 314, EE 334 can simultaneously write null events into the reminder of combining buffer 314. For example, upon writing event notification 322 in buffer modules 352 354, EE 334 can write null events into buffer modules 356 and 358. This allows EE 334 to initiate the enqueue operation without the need to write null events to any available capacity that may exist at that time.

Figure 4A:
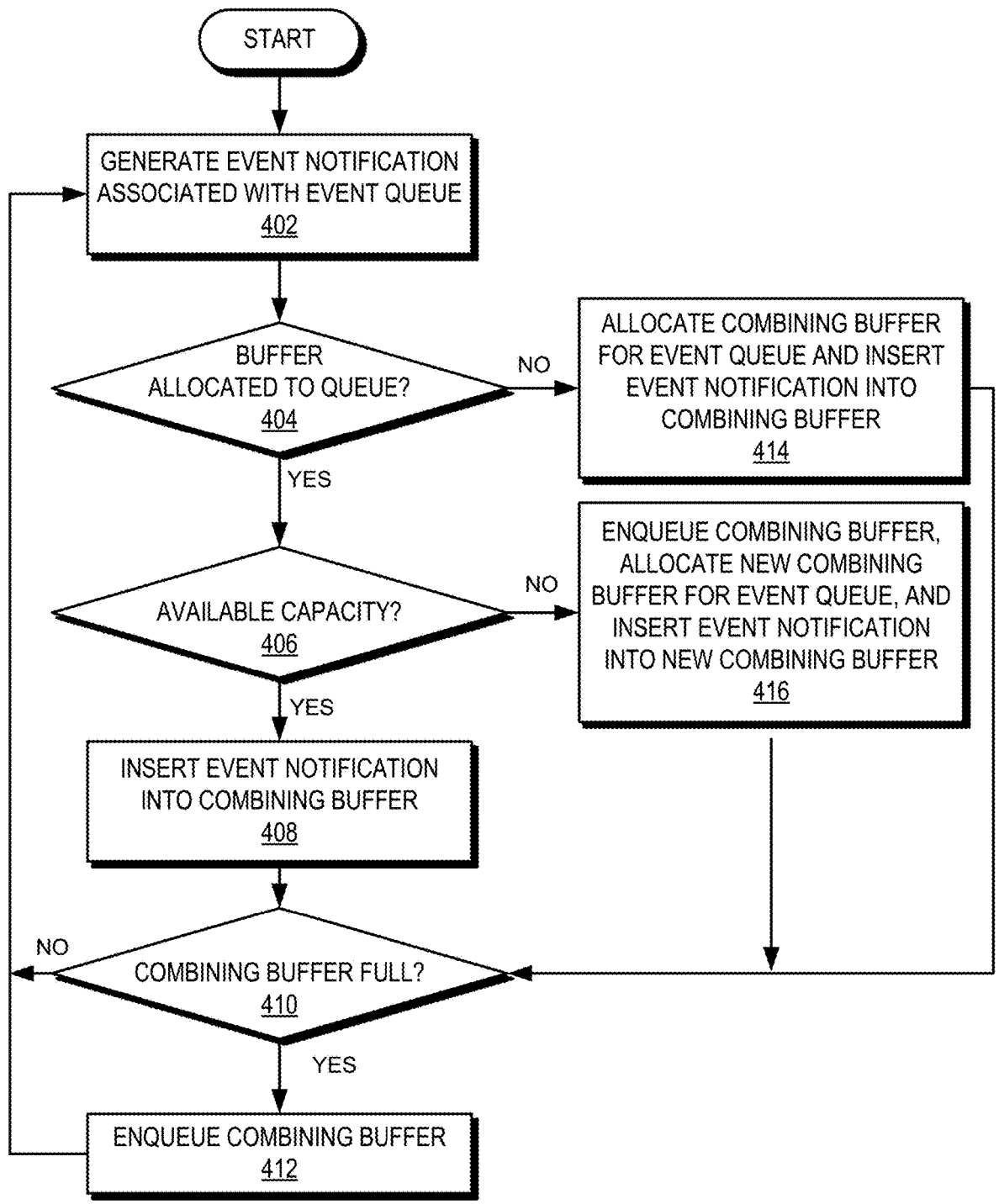
FIG. 4A shows a flow chart of an event notification combination process in a NIC.

FIG. 4A shows a flow chart of an event notification combination process in a NIC. During operation, an EE of the NIC can generate an event notification associated with an event queue (operation 402). The EE can determine whether a combining buffer is allocated to the event queue (operation 404). If a combining buffer is not allocated to the event queue, the EE can allocate a combining buffer for the event queue and insert the event notification into the combining buffer (operation 414). If a combining buffer is allocated to the event queue, the EE can determine whether the combining buffer has available capacity for event notification (operation 406).

If the combining buffer does not have sufficient available capacity, the EE can enqueue the combining buffer, allocate a new combining buffer for the event queue, and insert the event notification into the new combining buffer (operation 416). On the other hand, if the combining buffer has available capacity, the EE can insert the event notification into the combining buffer (operation 408). Upon inserting the event notification (operation 408, 414, or 416), the EE can determine whether the combining buffer is full (e.g., due to the insertion) (operation 410). If the combining buffer is full, the EE can enqueue the combining buffer (operation 412). If the combining buffer is not full (operation 410) or upon performing the enqueue operation (operation 412), the EE can continue to generate another event notification associated with an event queue (operation 402).

Figure 4B:
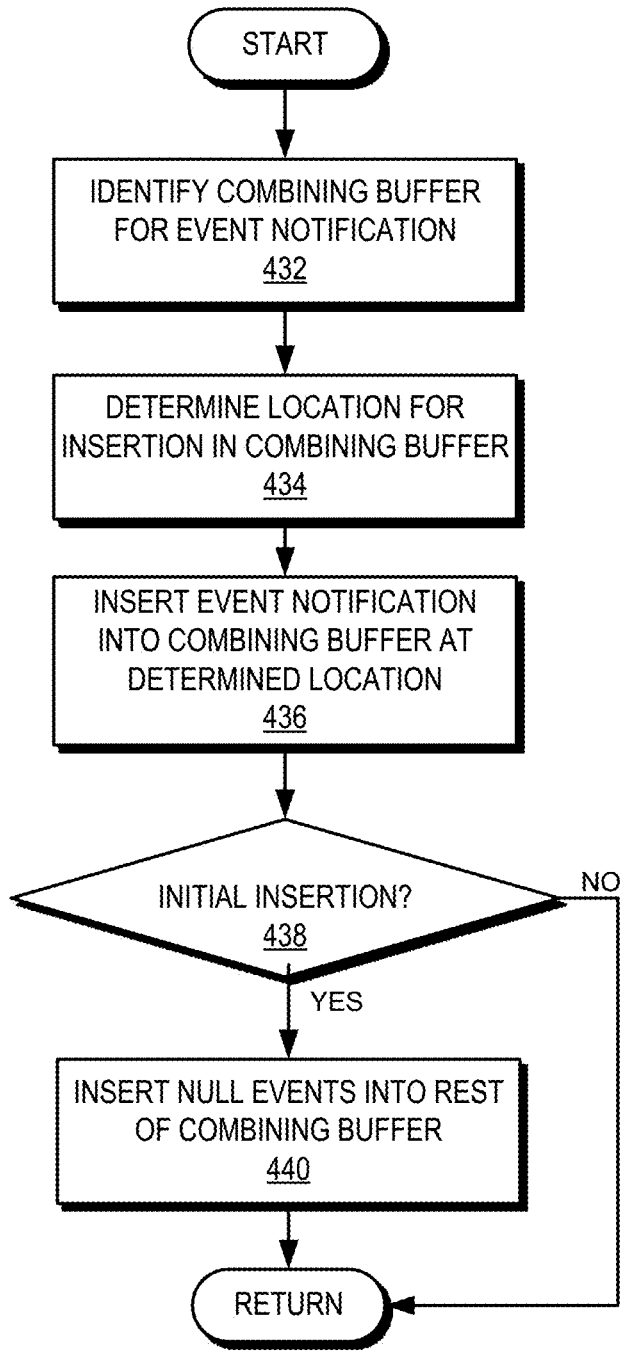
FIG. 4B shows a flow chart of an insertion process for a combining buffer in a NIC.

FIG. 4B shows a flow chart of an insertion process for a combining buffer in a NIC. During operation, an EE of the NIC can identify a combining buffer for an event notification (operation 432). The EE can then determine a location for insertion in the combining buffer (operation 434) and insert the event notification into the combining buffer at the determined location (operation 436). Subsequently, the EE can determine whether the insertion is the initial insertion (operation 438). If the insertion is the initial insertion, the EE can insert null events into the rest of the combining buffer (operation 440).

Figure 4C:
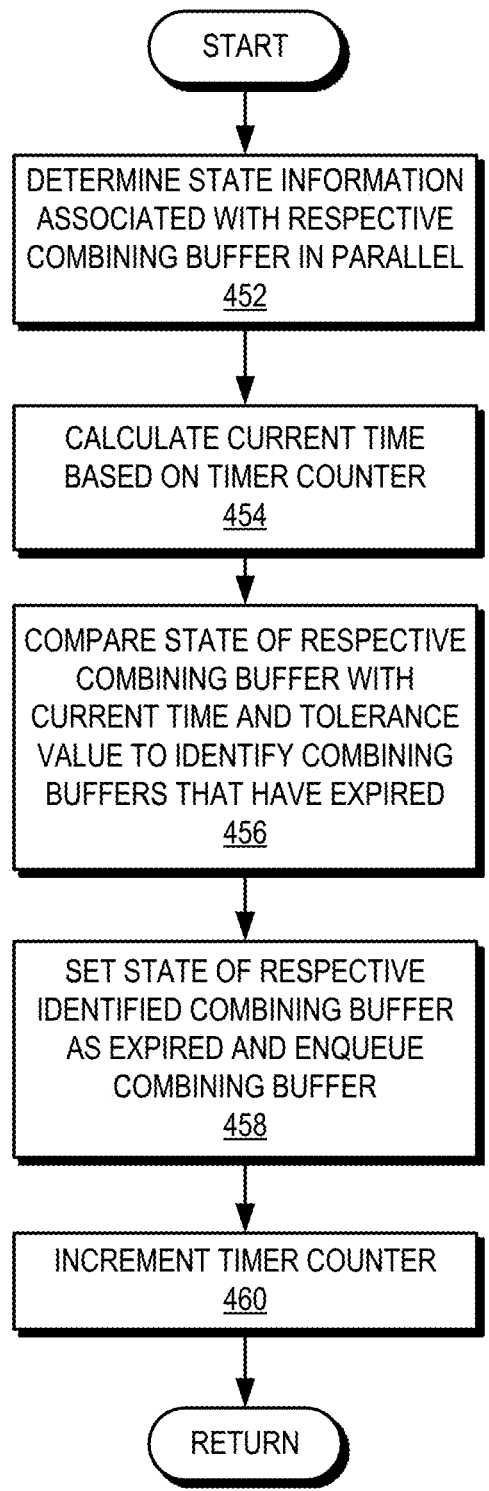
FIG. 4C shows a flow chart of a timer management process for a combining buffer of a NIC.

FIG. 4C shows a flow chart of a timer management process for a combining buffer of a NIC. During operation, the EE of the NIC can determine state information associated with a respective combining buffer in parallel (operation 452). The NIC can maintain a combining buffer for a respective event queue. Since the host device of the NIC can include a plurality of event queues, the NIC can maintain a plurality of combining buffers. The EE can then calculate a current time based on a timer counter (operation 454).

Subsequently, the EE can compare the state of a respective combining buffer with the current time and a tolerance value to identify combining buffers that have expired (operation 456). The EE can set the state of a respective identified combining buffer as expired and enqueue the combining buffer (operation 458). The EE can then increment the timer counter (operation 460). In some embodiments, the EE may increment the timer counter at a predetermined interval. Upon each increment, the EE can check which combining buffers have expired.

Exemplary Computer System

Figure 5:
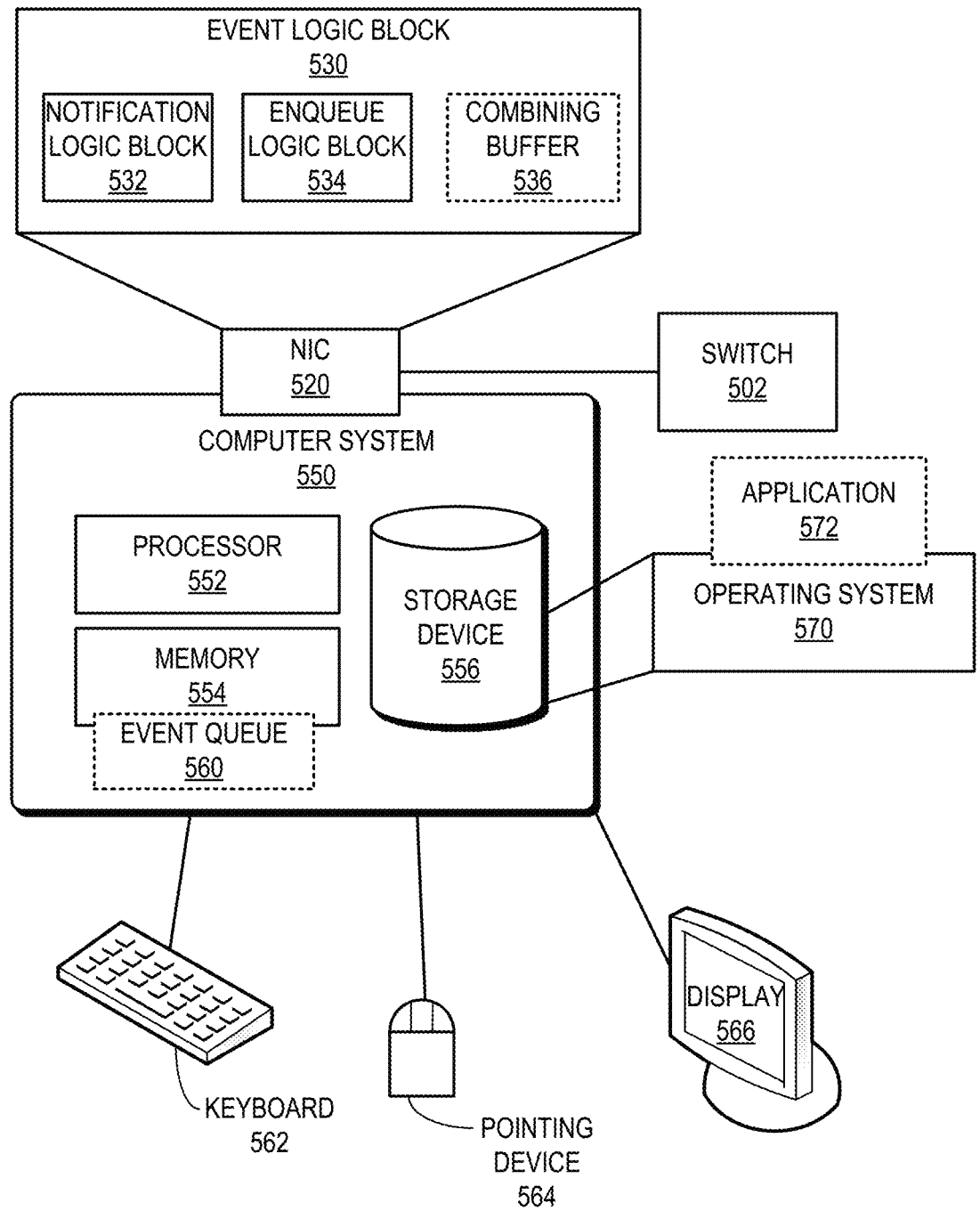
FIG. 5 shows an exemplary computer system equipped with a NIC that facilitates efficient event notification management.

FIG. 5 shows an exemplary computer system equipped with a NIC that facilitates efficient event notification management. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient event management. NIC 520 can provide one or more HNIs to computer system 550. NIC 520 can be coupled to a switch 502 via one of the HNIs. NIC 520 can include an event logic block 530, as described in conjunction with FIGS. 2B and 3. Event logic block 530 can include a notification logic block 532 and an enqueue logic block 534. Event logic block 530 can maintain a combining buffer 536, which can be associated with an event queue 560 in memory device 554.

Notification logic block 532 can generate an event notification and store the event notification in combining buffer 536. Notification logic block 532 can determine a release criterion for combining 536. The release criterion can indicate one or more of: whether combining buffer 536 has sufficient capacity for the next event notification and whether combining buffer 536 is full, and whether an event notification has been held in combining buffer 536, when it is partially full, for a sufficiently long duration so as to have reached the latency tolerance of event queue 560. If combining buffer 536 has met the release criterion (e.g., has stored a sufficient number of event notifications), enqueue logic block 534 can enqueue the content of combining buffer 536 into event queue 560 (e.g., based on a write request via the HI).

In summary, the present disclosure describes a NIC that facilitates efficient event management. The NIC can be equipped with a host interface, a first memory device, and an event management logic block. During operation, the host interface can couple the NIC to a host device. The event management logic block can identify an event associated with an event queue stored in a second memory device of the host device. The event management logic block can insert, into a buffer, an event notification associated with the event. The buffer can be associated with the event queue and stored in the first memory device. If the buffer has met a release criterion, the event management logic block can insert, via the host interface, the aggregated event notifications into the event queue.

The methods and processes described above can be performed by hardware logic blocks, modules, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmablelogic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
    maintaining, by a network interface controller (NIC) coupled to a host device, a plurality of buffers, a respective buffer corresponding to one of a plurality of event queues maintained in the host device;
    determining state information associated with a buffer of the plurality of buffers;
    calculating a current time based on a timer counter associated with the buffer;
    identifying the buffer as an expired buffer based on a state of the buffer, the current time, and a tolerance value associated with the buffer, the tolerance value indicating an amount of time that an event queue corresponding to the buffer is to wait to receive an event notification from the NIC;
    writing contents of the buffer to the corresponding event queue; and
    incrementing the timer counter.

2. The method of claim 1, wherein prior to determining the state information associated with the buffer, the method further comprises:
    generating event notifications associated with the corresponding event queue;
    storing an event notification in the buffer; and
    in response to determining that the tolerance value associated with the buffer is zero, inserting the contents of the buffer into the corresponding event queue.

3. The method of claim 2, further comprising:
    in response to determining that the tolerance value is a non-zero value:
        waiting until the timer counter corresponding to the tolerance value has expired; and
        subsequently inserting the contents of the buffer into the corresponding event queue.

4. The method of claim 2,
    wherein storing the event notification in the buffer is based on a duration of time indicated by the tolerance value.

5. The method of claim 2,
    wherein the buffer comprises a plurality of segments, and
    wherein storing the event notification in the buffer comprises writing the event notification to one or more segments of the buffer.

6. The method of claim 5, further comprising:
    allowing other segments of the plurality of segments to remain unmodified; and
    allowing one of the other segments to be read from while writing the event notification to the one or more segments.

7. The method of claim 5, wherein a size of the event notification is equal to a multiple of a size of a segment of the buffer.

8. The method of claim 1, wherein the event notification is associated with at least one of:
    completion of an event;
    an error associated with the event;
    telemetry data associated with the event; or
    a counting operation associated with the event.

9. The method of claim 1,
    wherein a first event queue of the plurality of event queues is associated with a first tolerance value,
    wherein a second event queue of the plurality of event queues is associated with a second tolerance value, and
    wherein the first tolerance value is equal to or different from the second tolerance value.

10. A network interface controller (NIC), comprising:
    a host interface coupling a host device;
    a first memory; and
    processing circuitry storing instructions to:
        maintain a plurality of buffers in the first memory device,
        wherein a respective buffer corresponds to one of a plurality of event queues maintained in a second memory of the host device;
        determine state information associated with a buffer of the plurality of buffers;
        calculate a current time based on a timer counter associated with the buffer;
        identify the buffer as an expired buffer based on a state of the buffer, the current time, and a tolerance value associated with the buffer,
        wherein the tolerance value indicates an amount of time that an event queue corresponding to the buffer is to wait to receive an event notification from the NIC;
        write contents of the buffer to the corresponding event queue; and
        increment the timer counter.

11. The NIC of claim 10, wherein prior to determining the state information associated with the buffer, the instructions are further to:
    generate event notifications associated with the corresponding event queue;
    store an event notification in the buffer; and
    insert the contents of the buffer into the corresponding event queue in response to determining that the tolerance value associated with the buffer is zero.

12. The NIC of claim 11, the instructions further to:
    in response to determining that the tolerance value is a non-zero value:
        wait until the timer counter corresponding to the tolerance value has expired; and
        subsequently insert the contents of the buffer into the corresponding event queue.

13. The NIC of claim 11,
    wherein the buffer comprises a plurality of segments,
    wherein storing the event notification in the buffer comprises writing the event notification to one or more segments of the buffer, and
    wherein the instructions are further to:
        allow other segments of the plurality of segments to remain unmodified; and allow one of the other segments to be read from while writing the event notification to the one or more segments.

14. The NIC of claim 13, wherein a size of the event notification is equal to a multiple of a size of a segment of the buffer.

15. The NIC of claim 10, wherein the event notification is associated with at least one of:
completion of an event;
an error associated with the event;
telemetry data associated with the event; or
a counting operation associated with the event.

16. The NIC of claim 10, the instructions further to:
subsequent to identifying the buffer which has expired, set the state of the buffer as expired.

17. A non-transitory computer-readable storage medium storing instructions to:
maintain, by a network interface controller (NIC) coupled to a host device, a plurality of buffers, a respective buffer corresponding to one of a plurality of event queues maintained in a memory of the host device;
determine state information associated with a buffer of the plurality of buffers;
calculate a current time based on a timer counter associated with the buffer;
identify the buffer as an expired buffer based on a state of the buffer, the current time, and a tolerance value,
the tolerance value indicating an amount of time that an event queue corresponding to the buffer is to wait to receive an event notification from the NIC;
write contents of the buffer to the corresponding event queue; and
increment the timer counter.

18. The non-transitory computer-readable storage medium of claim 17, wherein prior to determining the state information associated with the buffer, the instructions are further to:
generate event notifications associated with the corresponding event queue;
store an event notification in the buffer; and
in response to determining that the tolerance value is zero, insert the contents of the buffer into the corresponding event queue.

19. The non-transitory computer-readable storage medium of claim 18, the instructions further to:
in response to determining that the tolerance value is a non-zero value, wait until the timer counter corresponding to the tolerance value has expired prior to inserting the contents of the buffer into the corresponding event queue.

20. The non-transitory computer-readable storage medium of claim 18,
wherein the buffer comprises a plurality of segments, and
wherein storing the event notification in the buffer comprises writing the event notification to one or more segments of the buffer, and
wherein the instructions are further to:
allow other segments of the plurality of segments to remain unmodified; and
allow one of the other segments to be read from while writing the event notification to the one or more segments.

* * * * *